United States Patent [19]

Kiyonaga

[11] Patent Number: 4,621,900
[45] Date of Patent: Nov. 11, 1986

[54] LIQUID CRYSTAL COMPOSITIONS
[75] Inventor: Bunzo Kiyonaga, Shiojiri, Japan
[73] Assignee: Seiko Epson Corporation, Tokyo, Japan
[21] Appl. No.: 654,067
[22] Filed: Sep. 25, 1984
[30] Foreign Application Priority Data Sep. 27, 1983 [JP] Japan .................................. 58-178436

[51] Int. Cl.$^4$ ............................ G02F 1/13; C09K 3/34
[52] U.S. Cl. ............................. 350/350 R; 252/299.5; 252/299.63; 252/299.67; 252/299.68; 350/332; 350/333
[58] Field of Search ........... 252/299.5, 299.63, 299.67, 252/299.68; 350/350 R, 332, 333

[56] References Cited

U.S. PATENT DOCUMENTS

| 3,975,286 | 8/1976 | Oh .................................. 252/299.65 |
| 4,372,871 | 2/1983 | Toriyama et al. ............. 252/299.63 |

FOREIGN PATENT DOCUMENTS

| 2636684 | 2/1978 | Fed. Rep. of Germany ........................ 252/299.63 |
| 50-70287 | 6/1975 | Japan ............................ 252/299.68 |
| 53-5087 | 1/1978 | Japan ............................ 252/299.66 |
| 53-90177 | 8/1978 | Japan ............................ 252/299.67 |
| 53-95887 | 8/1978 | Japan ............................ 252/299.66 |
| 56-67388 | 6/1981 | Japan ............................ 252/299.63 |
| 56-68636 | 6/1981 | Japan ............................ 252/299.63 |
| 57-34176 | 2/1982 | Japan ............................ 252/299.63 |
| 57-51780 | 3/1982 | Japan ............................ 252/299.63 |
| 57-49687 | 3/1982 | Japan ............................ 252/299.67 |
| 57-49689 | 3/1982 | Japan ............................ 252/299.63 |
| 58-8781 | 1/1983 | Japan ............................ 252/299.63 |
| 58-42683 | 3/1983 | Japan ............................ 252/299.63 |
| 59-124978 | 7/1984 | Japan ............................ 252/299.63 |
| 59-135279 | 8/1984 | Japan ............................ 252/299.63 |

OTHER PUBLICATIONS

Toriyama, K., et al, The Physics and Chemistry of Liquid Crystal Devices, Sprokel, G., edit., Plenum Press, N.Y., pp. 153-171 (1980).
Toriyama, K., et al, J. de Physique, Coll. C3, Suppl. No. 4, vol. 40, C3-14 317-321 (Apr. 1979).

Primary Examiner—Teddy S. Gron
Attorney, Agent, or Firm—Blum Kaplan Friedman Silberman and Beran

[57] ABSTRACT

Liquid crystal compositions including as the main component at least one P, P'-dialkylazoxyhenzene selected from Compounds (1) of the general formula:

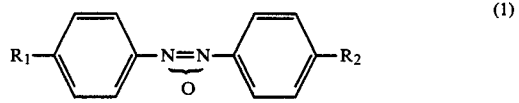

(1)

wherein $R_1$ represents a straight-chain alkyl group of 1-10 carbon atoms, and $R_2$ represents a straight-chain alkyl group of 1-10 carbon atoms and at least one component selected from Compounds (2), Compounds (3) and Compounds (4) of the general formulae, respectively:

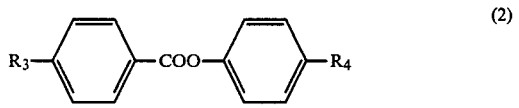

(2)

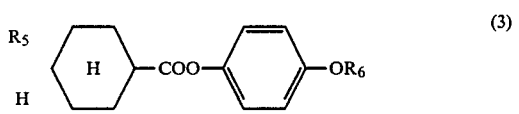

(3)

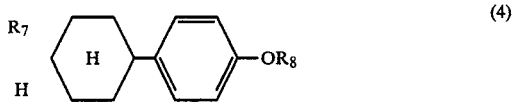

(4)

wherein $R_3$ represents a straight-chain alkyl or straight-chain alkoxy group of 1-10 carbon atoms, $R_4$ represents a straight-chain alkyl or straight-chain alkoxy group of 1-10 carbon atoms, $R_5$ represents a straight-chain alkyl group of 1-8 carbon atoms, $R_6$ represents a straight-chain alkyl group of 1-8 carbon atoms, and $R_7$ represents a straight-chain alkyl group of 1-10 carbon atoms and $R_8$ represents a straight-chain alkyl group of 1-10 carbon atoms. These liquid crystal compositions are suitable for multiplex drive.

14 Claims, 3 Drawing Figures

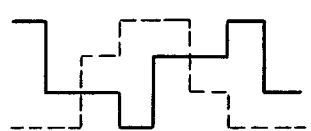
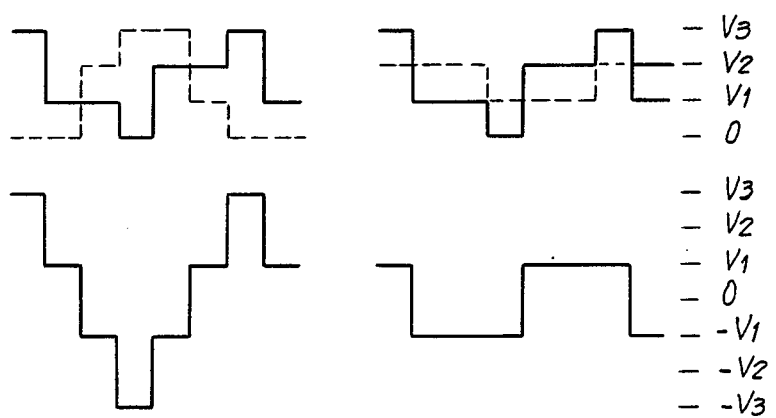
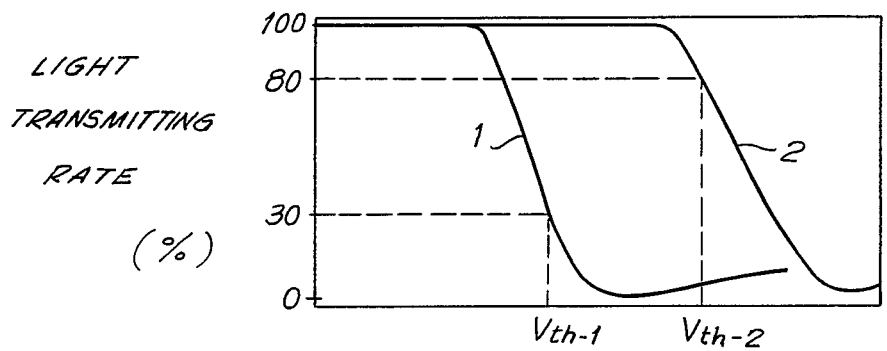
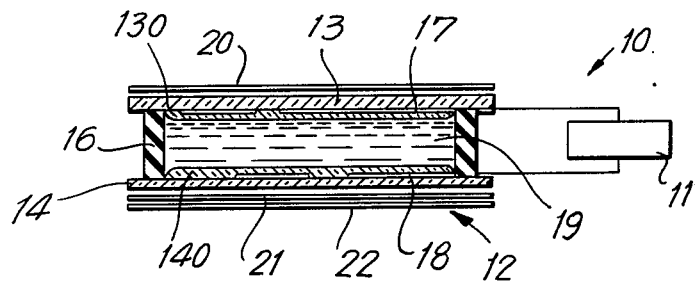

LIQUID CRYSTAL COMPOSITIONS

BACKGROUND OF THE INVENTION

1. Field of the Invention

This invention relates generally to nematic liquid crystal compositions and more specifically to mixed liquid crystal compositions including a P,P'-dialkylazoxybenzene as the main component. The compositions also include at least one component selected from an ester liquid crystal, a cyclohexanecarboxylate liquid crystal and a phenylcyclohexane liquid crystal. The mixed liquid crystal compositions have excellent multiplex characteristics and may be driven by a multiplex drive at a duty ratio of 1/64 or less, at a driving voltage of 15 V or less.

2. Description of the Prior Art

The known methods for driving TN-type liquid crystal display devices include static drive and multiplex drive. The multiplex drive is more advantageous for several reasons. Because the required number of leads can be reduced, (1) the structure of a liquid crystal cell can be simplified, (2) the number of joint parts between the liquid crystal cell and a drive circuit output members can be reduced and (3) the drive circuit can be simplified. In addition, when it is intended to provide a display of enlarged capacity, the required number of leads is increased further, and therefore, multiplex drive at a low duty ratio is required.

When the multiplex drive is used, there has been a problem in that the driving voltage is restricted depending on the liquid crystal material. For example, a selective wave-form of a multiplex drive wave-form is shown in FIG. 1(a) and a semi-selective wave-form thereof is shown in FIG. 1(b). The relationship between the voltage and the light transmittance of the liquid crystal cell corresponding to this wave-form is shown in FIG. 2. Graph 1 and Graph 2 show the relationship where the angle between the liquid crystal cell and the direction of observation (the viewing angle) is 80° when the selective wave-form (a) and the semi-selective wave-form (b) are applied to the liquid crystal cell, respectively. Vth-1 and Vth-2 represent the threshold voltages at light transmittance of 30% and 80%, respectively. At that time, the driving voltage range in which the multiplex drive can be performed with sufficient contrast is:

$$Vth\text{-}1 \leq Vd < Vth\text{-}2$$

On the other hand, the driving voltage can fluctuate due to a change in the battery voltage with time, scattering in the circuit and other reasons. Therefore, as a measure which allows for the fluctuation in the driving voltage, a voltage margin (M) is defined by the following equation:

$$M = \frac{(Vth-2) - (Vth-1)}{Vc} \times 100(\%)$$

wherein Vc is a driving voltage:

$$Vc = \tfrac{1}{2}[(Vth\text{-}2) + (Vth\text{-}1)]$$

and thus, demonstrates suitability of the liquid crystal in multiplex drive.

However, since the smaller the duty ratio in general, the lower the ratio of the effective voltage of the selective wave-form to that of the semi-selective wave-form, the difference between Vth-1 and Vth-2 decreases and so does the margin (M). Further, if the duty ratio is lowered more, then the following are obtained:

$$Vth\text{-}1 > Vth\text{-}2, \text{ and } M < 0$$

at which duty ratio, multiplex drive is not possible as a practical matter. Therefore, in order to provide a display having a larger capacity and high quality, a liquid crystal material to be driven by a multiplex drive at a smaller duty ratio with a wider voltage margin is required than is available.

Based on the above, there are known liquid crystal compositions including the following liquid crystal compounds:

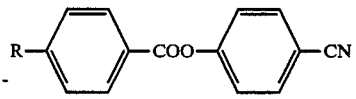

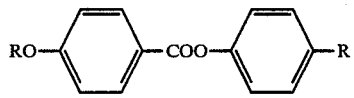

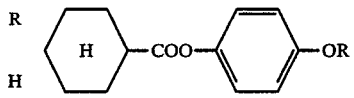

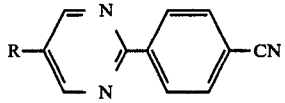

wherein R represents various straight-chain alkyl groups. However, it has been extremely difficult to provide a mixed liquid crystal composition which may be driven by a multiplex drive at a duty ratio of less than 1/16 by combining the above liquid crystal compounds. Therefore, it is desirable to provide an improved liquid crystal composition suitable for use in large capacity liquid crystal display devices which will overcome these shortcomings of the prior art.

SUMMARY OF THE INVENTION

Generally, speaking in accordance with the invention an improved liquid crystal composition is provided. The composition includes as a principal component at least one P,P'-dialkylazoxybenzene selected from Compounds (1) of the general formula:

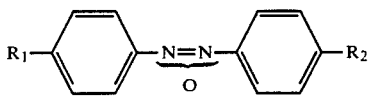

wherein $R_1$ represents a straight-chain alkyl group of 1-10 carbon atoms, and $R_2$ represents a straight-chain alkyl group of 1-10 carbon atoms, and at least one component selected from Compounds (2), Compounds (3) and Compounds (4) of the general formulae, respectively:

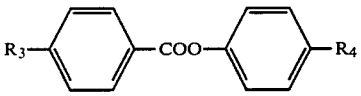

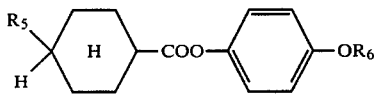

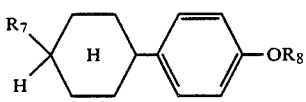

wherein $R_3$ represents a straight-chain alkyl or straight-chain alkoxy group of 1-10 carbon atoms, $R_4$ represents a straight-chain alkyl or straight-chain alkoxy group of 1-10 carbon atoms, $R_5$ represents a straight-chain alkyl group of 1-8 carbon atoms, $R_6$ represents a straight-chain alkyl group of 1-8 carbon atoms, $R_7$ represents a straight-chain alkyl group of 1-10 carbon atoms and $R_8$ represents a straight-chain alkyl group of 1-10 carbon atoms. These liquid crystal compositions are particularly well suited for multiplex drive.

Accordingly, it is an object of this invention to provide improved liquid crystal compositions.

Another object of the invention is to provide improved liquid crystal compositions including at least one dialkylazoxybenzene as the principal component.

It is a further object of this invention to provide a liquid crystal compositions having excellent multiplex characteristics which can satisfactorily driven by a multiplex drive at a duty ratio of at least as low as 1/64 at a driving voltage of 15 V or less.

Still another object of this invention is to provide liquid crystal display devices which can provide a large capacity display with high quality by using such liquid crystal compositions.

Yet another object of ths invention is to provide smaller and simplified liquid crystal display devices which utilize such liquid crystal compositions.

Still another additional object of this invention is to provide liquid crystal compositions for easily visible display devices having a high contrast and a wide viewing angle range.

Still other objects and advantages of the invention will in part be obvious and will in part be apparent from the specification.

The invention accordingly comprises a composition of matter possessing the characteristics, properties, and the relation of constituents which will be exemplified in the composition hereinafter described and the apparatus embodying features of construction, combination of elements and arrangement of parts which are adapted to effect such characteristics, all as exemplified in the following detailed disclosure, and the scope of the invention will be indicated in the claims.

BRIEF DESCRIPTION OF THE DRAWINGS

For a fuller understanding of the invention, reference is had to the following description taken in connection with the accompanying drawings, in which:

FIG. 1 shows an example of a multiplex drive wave-form in which (a) shows a selective wave-form and (b) shows a semi-selective wave-form;

FIG. 2 is a graph illustrating the relationship between the voltage and the light transmittance of a display device; and FIG. 3 is a cross-sectional view of a liquid crystal display device including a liquid crystal composition of this invention.

DETAILED DESCRIPTION OF THE INVENTION

The liquid crystal compositions of the invention are particularly well suited for multiplex drive and include as the main component between about 30 to 80 weight percent of at least one P, P'-dialkylazoxyhenzene selected from Compounds (1) of the general formula:

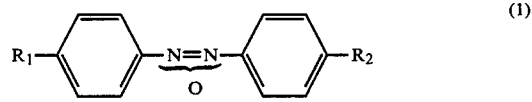

wherein $R_1$ represents a straight-chain alkyl group of 1-10 carbon atoms, and $R_2$ represents a straight-chain alkyl group of 1-10 carbon atoms and at least one component selected from Compounds (2), Compounds (3) and Compounds 4 of the general formulae and weight percentages, respectively:

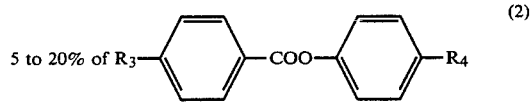

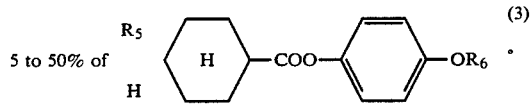

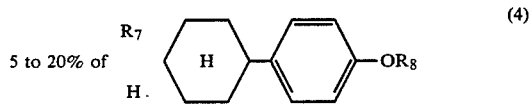

wherein $R_3$ represents a straight-chain alkyl or straight-chain alkoxy group of 1-10 carbon atoms, $R_4$ represents a straight-chain alkyl or straight-chain alkoxy group of 1-10 carbon atoms, $R_5$ represents a straight-chain alkyl group of 1-8 carbon atoms, $R_6$ represents a straight-chain alkyl group of 1-8 carbon atoms, $R_7$ represents a straight-chain alkyl group of 1-10 carbon atoms and $R_8$ represents a straight-chain alkyl group of 1-10 carbon atoms.

The Compounds (1) P,P'-dialkylazoxybenzene included in the compositions of this invention principally enhance the contrast markedly when a liquid crystal display device including such compositions is driven in multiplex drive and viewed at a constant viewing angle.

The greater the sum of the number of carbon atoms of $R_1$ and $R_2$, the greater the effect. At the same time the smectic properties increase. Thus, it is necessary to select a suitable component and include it in an appropriate amount. Therefore, the sum of the carbon atoms of $R_1$ and $R_2$ is desirably between about 8 and 14, and is preferably about 10. The compositions in accordance with the invention preferably include between about 30–80% by weight of Compounds (1).

Compounds (2), (3) and (4) are included in the compositions in accordance with the invention mainly to widen the nematic mesomorphic range (particularly the lower temperature side) while impairing the excellent multiplex characteristics as little as possible. Although Compounds (2) are not essential, if present in an amount between about 5–20% by weight, they enhance the contrast at a constant viewing angle of the liquid crystal display device in multiplex drive although such effect is less than Compounds (1). The greater the sum of the number of carbon atoms of $R_3$ and $R_4$ in the Compound (2) included, the greater the above-described effect, but there is a resulting increase in the viscosity.

Compounds (3), when included in the compositions in accordance with the invention, are included in an amount between about 5 to 50% by weight. Compounds (3) tend to widen further the viewing angle range of the liquid crystal display device. They also suppress cross-talk on the lower viewing angle side when the display device is driven in multiplex drive.

When Compounds (4) are included, preferably they are present in an amount between about 5 to 20% by weight. Compounds (4) further decrease the viscosity of the liquid crystal composition, and reduce the response time of a liquid crystal display device including such a liquid crystal composition.

The optical anisotropy of Compounds (1)–(4) are about 0.02 for Compounds (1), about 0.15 for Compounds (2), about 0.10 for Compounds (3) and about 0.10 for Compounds (4). All of Compounds (1), (2), (3) and (4) used in the compositions in accordance with the invention are stable.

Specific examples of Compounds (1)–(4) used in this invention are set forth in the following Table 1 with the melting and clearing points.

TABLE 1-1

COMPOUNDS (1)

| Compound Number | $R_1$ | $R_2$ | Melting Point (°C.) | Clearing Point (°C.) |
|---|---|---|---|---|
| 1 | $C_3H_7$ | $C_3H_7$ | 65.0 | 60.0 |
| 2 | $C_4H_9$ | $C_4H_9$ | 14.0 | 27.5 |
| 3 | $C_5H_{11}$ | $C_5H_{11}$ | 22.0 | 65.0 |
| 4 | $C_6H_{13}$ | $C_6H_{13}$ | 22.0 | 50.5 |
| 5 | $C_7H_{15}$ | $C_7H_{15}$ | 34.5 | 71.5 |
| 6 | $C_8H_{17}$ | $C_8H_{17}$ | 41.0 | 69.5 |
| 7 | $C_9H_{19}$ | $C_9H_{19}$ | 45.5 | 77.5 |
| 8 | $C_{10}H_{21}$ | $C_{10}H_{21}$ | 51.0 | 77.0 |
| 9 | $C_2H_5$ | $C_5H_{11}$ | 17.0 | 44.0 |
| 10 | $C_3H_7$ | $C_5H_{11}$ | 27.0 | 64.0 |
| 11 | $C_4H_9$ | $C_5H_{11}$ | 12.0 | 54.2 |
| 12 | $C_5H_{11}$ | $C_6H_{13}$ | 21.0 | 61.5 |
| 13 | $C_6H_{13}$ | $C_4H_9$ | 31.5 | 47.6 |

TABLE 1-2

COMPOUNDS (2)

| Compound Number | $R_3$ | $R_4$ | Melting Point (°C.) | Clearing Point (°C.) |
|---|---|---|---|---|
| 14 | $CH_3O$ | $C_5H_{11}$ | 29.0 | 42.0 |
| 15 | $C_4H_9$ | $OC_6H_{13}$ | 29.0 | 50.0 |
| 16 | $C_5H_{11}$ | $C_3H_7$ | 23.0 | 20.0 |

TABLE 1-2-continued

COMPOUNDS (2)

| Compound Number | $R_3$ | $R_4$ | Melting Point (°C.) | Clearing Point (°C.) |
|---|---|---|---|---|
| 17 | $C_5H_{11}$ | $C_5H_{11}$ | 33.0 | 12.0 |
| 18 | $C_5H_{11}$ | $C_6H_{13}$ | 19.8 | 31.0 |
| 19 | $C_5H_{11}$ | $OC_6H_{13}$ | 40.0 | 59.0 |
| 20 | $C_6H_{13}$ | $OC_4H_9$ | 39.0 | 49.0 |
| 21 | $C_6H_{13}O$ | $C_5H_{11}$ | 50.0 | 62.0 |
| 22 | $C_6H_{13}O$ | $C_7H_{15}$ | 45.0 | 63.0 |
| 23 | $C_6H_{13}O$ | $C_8H_{17}$ | 44.0 | 62.0 |
| 24 | $C_6H_{13}O$ | $OC_8H_{17}$ | 54.0 | 89.0 |
| 25 | $C_7H_{15}$ | $C_3H_7$ | 20.5 | 24.0 |
| 26 | $C_7H_{15}$ | $C_4H_9$ | 19.5 | 18.0 |
| 27 | $C_7H_{15}$ | $C_5H_{11}$ | 25.0 | 30.0 |
| 28 | $C_7H_{15}$ | $C_6H_{13}$ | 31.5 | 27.0 |
| 29 | $C_7H_{15}$ | $OC_6H_{13}$ | 33.0 | 60.5 |
| 30 | $C_7H_{15}$ | $OC_7H_{15}$ | 45.5 | 60.0 |
| 31 | $C_7H_{15}$ | $OC_8H_{17}$ | 48.0 | 63.5 |
| 32 | $C_8H_{17}$ | $C_7H_{15}$ | 30.5 | 33.5 |
| 33 | $C_8H_{17}$ | $OC_8H_{17}$ | 47.5 | 61.5 |

TABLE 1-3

COMPOUNDS (3)

| Compound Number | $R_5$ | $R_6$ | Melting Point (°C.) | Clearing Point (°C.) |
|---|---|---|---|---|
| 34 | $C_2H_5$ | $C_4H_9$ | 33.0 | 39.0 |
| 35 | $C_3H_7$ | $C_2H_5$ | 47.0 | 78.0 |
| 36 | $C_3H_7$ | $C_4H_9$ | 41.0 | 71.0 |
| 37 | $C_3H_7$ | $C_5H_{11}$ | 37.5 | 66.5 |
| 38 | $C_4H_9$ | $CH_3$ | 42.0 | 60.0 |
| 39 | $C_4H_9$ | $C_2H_5$ | 35.5 | 74.0 |
| 40 | $C_4H_9$ | $C_6H_{13}$ | 27.0 | 71.0 |
| 41 | $C_5H_{11}$ | $CH_3$ | 40.0 | 69.5 |
| 42 | $C_5H_{11}$ | $C_5H_{11}$ | 35.5 | 75.0 |
| 43 | $C_6H_{13}$ | $C_2H_5$ | 49.0 | 83.0 |

TABLE 1-4

COMPOUNDS (4)

| Compound Number | $R_7$ | $R_8$ | Melting Point (°C.) | Clearing Point (°C.) |
|---|---|---|---|---|
| 44 | $C_3H_7$ | $C_5H_{11}$ | 40.4 | 29.0 |
| 45 | $C_4H_9$ | $C_4H_9$ | 42.0 | 32.0 |
| 46 | $C_4H_9$ | $C_5H_{11}$ | 37.0 | 28.5 |
| 47 | $C_4H_9$ | $C_6H_{13}$ | 33.0 | 35.0 |
| 48 | $C_4H_9$ | $C_7H_{15}$ | 40.6 | 38.6 |
| 49 | $C_5H_{11}$ | $C_3H_7$ | 35.0 | 30.0 |
| 50 | $C_5H_{11}$ | $C_4H_9$ | 49.0 | 47.9 |
| 51 | $C_5H_{11}$ | $C_5H_{11}$ | 35.2 | 40.5 |
| 52 | $C_5H_{11}$ | $C_6H_{13}$ | 38.4 | 40.1 |
| 53 | $C_5H_{11}$ | $C_7H_{15}$ | 48.5 | 48.0 |
| 54 | $C_6H_{13}$ | $C_2H_5$ | 33.2 | 44.5 |
| 55 | $C_7H_{15}$ | $C_2H_5$ | 52.8 | 53.4 |
| 56 | $C_3H_7$ | $C_2H_5$ | 43.0 | 40.0 |
| 57 | $C_3H_7$ | $C_4H_9$ | 37.0 | 35.0 |
| 58 | $C_4H_7$ | $C_2H_5$ | 48.0 | 34.4 |
| 59 | $C_5H_{11}$ | $CH_3$ | 42.5 | 34.5 |
| 60 | $C_5H_{11}$ | $C_2H_5$ | 51.0 | 49.0 |

The following examples are illustrative of liquid crystal compositions prepared in accordance with the invention using the compounds set forth in Table 1. Individual examples of compositions are set forth in Table 2. These examples are for purposes of illustration only and are not intended in a limiting sense.

In each case the liquid crystal compositions exemplified in Table 2 is used in a liquid crystal display device 10 as shown in FIG. 3. A multiplex drive circuit 11 applies a multiplex signal to a liquid crystal cell 12 to drive liquid crystal cell 12. Liquid crystal cell 12 includes an upper electrode substrate 13 and a lower electrode substrate 14 spaced apart from each other at a predetermined distance fixed by a spacer 16. Electrode substrates 13 and 14 have electrodes 17 and 18 on the inner surfaces, respectively. In order to maintain the distance between electrode substrates 13 and 14 constant, it is also possible to utilize another type of spacer, such as glass fiber, glass balls and the like within liquid crystal cell 12. Liquid crystal cell 12 includes an upper polarizer 20 and a lower polarizer 21 with a reflector 22 on the underside. If liquid crystal display device 10 is of the transmission type, reflector 22 is not included.

A liquid crystal composition in accordance with this invention 19 is placed between the upper and lower electrode substrates 13 and 14 which are covered with a liquid crystal aligning layer 130 and 140, respectively on at least the surfaces in contact with liquid crystal composition 19. The substrates have been positioned so that the alignment is at an angle of about 90° (80°–100°). The driving signal is selectively applied to electrodes 17 and 18 for changing the alignment of liquid crystal molecules in composition 19. This causes light passing through liquid crystal cell 12 to render the region where the alignment has been changed visually distinguishable from the region where it has not been changed. Thus, the light is divided into a reflected (or transmitted) region and a shielded region for providing a display. At least one of electrodes 17 and 18 is a transparent electrode. In the transmission type cell both electrodes 17 and 18 in at least the display portion of cell 12 are both transparent electrodes.

Further, by eliminating light of a wavelength of 410 nm or less, ultraviolent light is prevented from reaching the liquid crystal and prevents deterioration or decomposition of the liquid crystal material. In the transmission type liquid crystal display device, a filter is disposed between liquid crystal 19 and a light source. For example, electrode substrate 13 and upper polarizer 10 may be formed with filtering characteristics, or a filter may be positioned on upper polarizer 20 or between electrode substrate 13 and upper polarizer 20. It is also possible to impart filtering characteristics to an adhesive used for bonding upper polarizer 20 to upper substrate 13. The filter having such characteristics protects the liquid crystal from ultraviolet light and also is free from yellow coloring when visually observed, thereby maintaining the quality of the liquid crystal display. In the case of the transmission type liquid crystal display device, a filter having similar characteristics is also positioned between the backlight source and liquid crystal 19.

TABLE 2

| Compound | | Example 1 | Example 2 | Example 3 | Example 4 | Example 5 |
|---|---|---|---|---|---|---|
| Compounds (1) | 2 | | 21.0 | 14.0 | | |
| | 3 | 27.0 | 21.0 | 21.0 | 30.4 | 30.4 |
| | 4 | 13.0 | 7.0 | 10.5 | 14.6 | 14.6 |
| | 5 | | 14.0 | 14.0 | | |
| | 12 | | 7.0 | 10.5 | | |
| Compounds (2) | 19 | | | 3.3 | | |
| | 22 | | | 3.3 | | |
| | 24 | | | 3.4 | | |
| Compounds (3) | 37 | 9.7 | 2.4 | | 3.5 | 2.5 |
| | 40 | 9.7 | 2.4 | | 3.5 | 2.5 |
| | 42 | 13.4 | 3.4 | | 4.9 | 3.5 |
| | 43 | 7.2 | 1.8 | | 2.6 | 2.0 |
| Compounds (4) | 44 | | 2.0 | 2.0 | | |
| | 45 | | 1.0 | 1.0 | | |
| | 51 | | 2.4 | 2.4 | | |
| | 52 | | 2.6 | 2.6 | | |
| | 53 | | 2.0 | 2.0 | | |
| | 56 | 6.8 | | | .6.8 | 6.8 |
| | 57 | 3.2 | | | 3.2 | 3.2 |
| 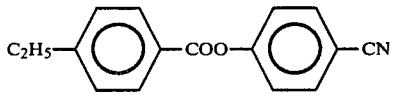 | | 10.0 | 5.0 | 5.0 | 13.0 | 13.0 |
| 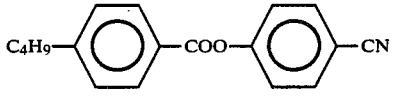 | | | 5.0 | 5.0 | 13.5 | 13.5 |
| * | | | | | | 4.0 |
| ** | | | | | 4.0 | 4.0 |
| Clearing Point (°C.) | | 55.0 | 53.0 | 55.0 | 55.0 | 61.5 |
| −30° C. for 4 days | | o | o | o | o | o |
| Vth - 1 | | 13.99 | 15.31 | 14.81 | 9.71 | 10.36 |
| Vth - 2 | | 14.28 | 15.79 | 15.34 | 9.87 | 10.43 |
| M (25° C., %) | | 2.1 | 3.1 | 3.5 | 1.6 | 0.7 |
| Response Time at 25° C. (msec) | | | | | | |
| CR | | 120 | 80 | 90 | 100 | 105 |
| CF | | 120 | 80 | 90 | 100 | 105 |

TABLE 2-continued

|  | Example | | | | |
| --- | --- | --- | --- | --- | --- |
| Compound | 1 | 2 | 3 | 4 | 5 |
| Cell Thickness | 5.0μ | 5.2μ | 5.2μ | 5.1μ | 5.3μ |

Notes

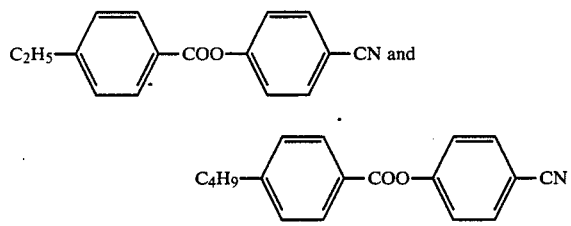

In Table 2, the mark [o] indicates that a cell into which the composition according to this invention had been sealed did not crystallize even after maintaining the cell at −30° C. for 4 days. The Vth-1, Vth-2, M and response time all show suitable characteristics when driven with a wave-form at a duty ratio of 1/64 at a voltage of 9 V. In each example, a practically sufficient voltage margin (M) was obtained.

Compounds Number 2–57 in Table 2 are the same compounds as identified in Table 1. In the present examples, a nematic liquid crystal compound exhibiting a positive dielectric anisotropy, such as the ester:

$$C_2H_5-\bigcirc-COO-\bigcirc-CN \text{ and}$$

$$C_4H_9-\bigcirc-COO-\bigcirc-CN$$

was added as indicated on Table 2. In addition, conventioned ester liquid crystal compounds, conventional biphenyl liquid crystal compounds, conventional phenylcyclohexane liquid crystal compounds or mixtures thereof may also be used. As a liquid crystal for raising the clearing point, appropriate amounts of 4HEA3 and 4HEA4 were added. Alternatively, they may be replaced by conventional terphenyl liquid crystal compounds, conventional biphenylcyclohexane liquid crystal compounds or mixtures thereof.

The examples of this invention will now be described in detail. The liquid crystal compositions of Examples 1–5 of this invention successfully provided positive margins using drive at a duty ratio of 1/64 by including at least one component from Compounds (1) and also at least one compound from Compounds (2), (3) and (4). Further, as shown in Examples 1–5, the liquid crystal compositions of this invention do not crystallize at lower temperatures and the temperatures for the clearning points are high. Thus, they are advantageous in that the temperature use ranges are wide and there are no problems in practice. These effects have been attained by including at least one component from Compounds (2), (3) and (4) in the liquid crystal compositions of this invention.

The liquid crystal composition of Example 1 was prepared by mixing 40% of Compounds (1), 40% of Compounds (3), 10% of Compounds (4) and 10% of 4-cyanophenyl-4'-ethylphenylcarboxylate ester as a nematic liquid crystal having positive dielectric anisotropy. Although the driving voltage was as low as 15 V or less, a positive margin was obtained when driven at a duty ratio of 1/64. Further, the response time also showed excellent characteristics.

The liquid crystal composition of Example 2, in contrast to that of Example 1, was prepared by increasing the Compounds (1) to 70% and mixing with 10% of Compounds (3), 10% of compounds (4) and 5.0% of the ester of Example 1 and 5.0% of 4-cyanophenyl-4'-n-butylphenylcarboxylate ester as a nematic liquid crystal having positive dielectric anisotropy. The driving voltage was more than 15 V, but the voltage margin M was increased. Also, the response time was reduced. This indicates that components of Compounds (1) possess excellent multiplex characteristics and provide a liquid crystal composition having low viscosity.

The liquid crystal composition of Example 3 is similar to Example 2, except that Compounds 4 and 12 in which the sums of the carbon atoms in $R_1$ and $R_2$ are 12 and 11, respectively, were increased and the 10% of Compounds (3) were replaced by 10% of Compounds (2). Although the driving voltage was decreased as compared with Example 2, the voltage margin increased and the response time increased. This indicates that Compounds (1) provide improved multiplex characteristics when the components have a greater number of carbon atoms as compared with the components having a smaller number of carbon atoms. At the same time, it indicates that Compounds (2) as compared with Compounds (3), have better multiplex characteristics, but have higher viscosities.

The liquid crystal composition of Example 4 was prepared by mixing 45% of Compounds (1), 14.5% of Compounds (3), 10% of Compounds (4), 13.0% of the ethyl ester of Example 1 and 13.5% of the n-butyl ester of Examples 2 and 3 as the nematic liquid crystals having positive dielectric anisotropy and 4% of 4HEA4 as a liquid crystal for raising the clearing point. Although the driving voltage was as low as 10 V or less, the voltage margin M showed a positive value.

Example 5 is similar to Example 4, except that the Compounds (3) were reduced to 4% and 4% of 4HEA4 was added in order to raise the clearing point. Although the clearing point rose to 61.5° C., the margin M showed a positive value at a voltage of more or less the same level. Thus, Examples 4 and 5 show that multiplex drive is possible at a duty ratio of 1/64 even at a low driving voltage of aobut 10 V.

The liquid crystal compositions of Examples 1–5 all have optical anisotropy Δn of about 0.18. The liquid crystal display devices using said liquid crystal compositions had a retardation value R, i.e., a product of the optical anisotrophy Δn multiplied by the layer thickness of the liquid crystal of about 1μ.

When the liquid crystal compositions of this invention are used, it is possible to drive at a duty ratio of 1/98 or at a duty ratio of 1/128 by changing the definitions of Vth-1 and Vth-2.

As have been described hereinabove, Examples 1-5 show that by adjusting the proportions of Compounds (1), (2), (3) and (4), liquid crystal compositions having large voltage margins M and also excellent response characteristics may be constructed.

Further, the liquid crystal compositions of this invention specifically illustrated in Examples 1-5 have driving voltages in the vicinity of as low as 15 V. In particular, the voltages of Examples 4 and 5 are as low as about 10 V. To lower the voltage is advantageous not only in view of the simplication of the electrical source and the minaturization of the device, but also in view of the production of drive integrated circuits. The integrated circuits are generally manufactured with C-MOS in view of the easy production and lower power consumption, but if the driving voltage is higher, the production is very difficult. Since the liquid crystal compositions of this invention do not require a particularly high driving voltage, the production of drive circuits with C-MOS is easy, and also the yield is good and the cost is low. Thus, advantages is also found with the drive circuits.

As demonstrated in the examples, by making the retardation R approach about 1μ, there is no coloring due to the retardation, and thus a liquid crystal display device performing monochromatic display with a good contrast is provided.

Further, it is also possible to add biphenyl compounds and phenylcyclohexane compounds instead of or in addition to

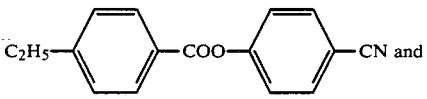

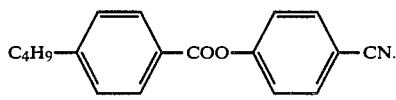

Furthermore, it is also possible to add terphenyl compounds and biphenylcyclohexane compounds instead of or in addition to the compounds indicated by * and ** in Table 2.

As have been described above, since the liquid crystal display devices using the liquid crystal compositions of this invention have excellent multiplex characteristics which provide suitable displays at a duty ratio of down to 1/64 at a driving voltage of 15 V or less, they permit large high quality displays. Thus, their practical value is very high.

It will thus be seen that the objects set forth above, among those made apparent from the preceding description, are efficiently attained and, since certain changes may be made in the above composition of matter and in the construction of the apparatus including the composition without departing from the spirit and scope of the invention, it is intended that all matter contained in the above description shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

Particularly it is to be understood that in said claims, ingredients or compounds recited in the singular are intended to include compatiable mixtures of such ingredients wherever the sense permits.

What is claimed is:

1. A liquid crystal composition comprising at least one P,P'-dialkylazoxybenzene component having the general formula (1) as follows:

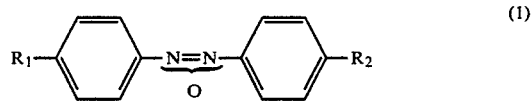

wherein $R_1$ represents a straight-chain alkyl group of 1-10 carbon atoms, and $R_2$ represents a straight-chain alkyl group of 1-10 carbon atoms and at least one component selected from the group of Compounds (2), Compounds (3) and Compounds (4) of the general formulae, respectively:

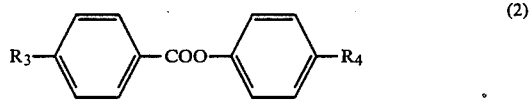

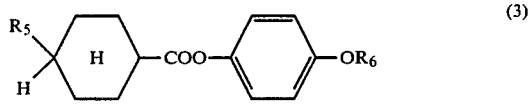

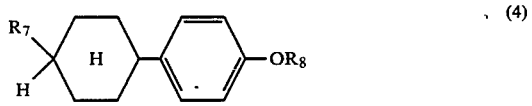

wherein $R_3$ represents a straight-chain alkyl or straight-chain alkoxy group of 1-10 carbon atoms, $R_4$ represents a straight-chain alkyl or straight-chain alkoxy group of 1-10 carbon atoms, $R_5$ represents a straight-chain alkyl group of 1-8 carbon atoms, $R_6$ represents a straight-chain alkyl group of 1-8 carbon atoms, $R_7$ represents a straight-chain alkyl group of 1-10 carbon atoms, and $R_8$ represents a straight-chain alkyl group of 1-10 atoms, and including about 30-80 weight percent of compounds of formula (1), when present about 5-20 weight percent of compounds of formula (2), when present about 5-50 weight percent of compounds of formula (3), when present about 5-20 weight percent of compounds of formula (4) and an effective amount of a compound exhibiting a positive dielectric anistropy to yield a composition having a net positive dielectric anistropy.

2. The liquid crystal composition of claim 1, wherein the sum of the number of carbon atoms in $R_1$ and $R_2$ is between about 8 and 14.

3. The liquid crystal composition of claim 1, wherein the sum of the number of carbon atoms in $R_1$ and $R_2$ is 10.

4. The liquid crystal composition of claim 1, wherein $R_1$ contains between 4-7 carbon atoms and $R_2$ contains between 4-7 carbon atoms.

5. The liquid crystal composition of claim 1, wherein the number of carbon atoms in $R_3$ is 5 or 6 carbon atoms and in $R_4$ is between 6-8 carbon atoms.

6. The liquid crystal composition of claim 1, wherein the number of carbon atoms in $R_5$ contains between 3-6 carbon atoms and $R_6$ contains between 2-6 carbon atoms.

7. The liquid crystal composition of claim 1, wherein the number of carbon atoms in $R_7$ is between 3-5 and the number of carbon atoms in $R_8$ is between 2-7.

8. The liquid crystal composition of claim 1, wherein the compound exhibiting a positive dielectric anistropy is selected from the group consisting of biphenyl liquid crystal compounds, phenylcyclohexane liquid crystal compounds, terphenyl liquid crystal compounds, biphenylcyclohexane liquid crystal compounds or mixtures thereof.

9. A liquid crystal display device, comprising two opposed spaced apart substrates, at least one of which is transparent, electrodes selectively deposited on the interior surfaces of each substrate, the electrode on the at least one transparent substrate being a transparent electrode, a liquid crystal composition disposed between the substrates, and a polarizer on the outer surface of each substrate, said liquid crystal composition comprising at least one P,P'dialkylazoxybenzene component having the general formula (1) as folows:

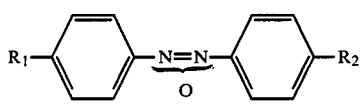

(1)

wherein $R_1$ represents a straight-chain alkyl group of 1-10 carbon atoms, and $R_2$ represents a straight-chain alkyl group of 1-10 carbon atoms and at least one component selected from the group of Compounds (2), Compounds (3) and Compounds (4) of the general formulae, respectively:

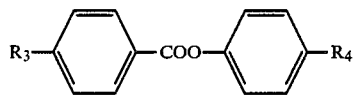

(2)

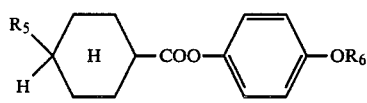

(3)

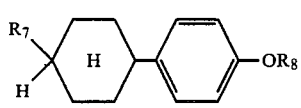

(4)

wherein $R_3$ represents a straight-chain alkyl or straight-chain alkoxy group of 1-10 carbon atoms, $R_4$ represents a straight-chain alkyl or straight-chain alkoxy group of 1-10 carbon atoms, $R_5$ represents a straight-chain alkyl group of 1-8 carbon atoms, $R_6$ represents a straight-chain alkyl group of 1-8 carbon atoms, $R_7$ represents a straight-chain alkyl group of 1-10 carbon atoms and $R_8$ represents a straight-chain alkyl group of 1-10 atoms, and including about 30-80 weight percent of compounds of formula (1), when present about 5-20 weight percent of compounds of formula (2), when present about 5-50 weight percent of compounds of formula (3), when present about 5-20 weight percent of compounds of formula (4) and an effective amount of a compound exhibiting a positive dielectric anistropy to yield a composition havaing a net positive dielectric anistropy.

10. The liquid crystal display device of claim 9, further including multiplex drive circuit means coupled to the electrodes on the substrates for generating signals to be selectively applied to the electrodes for rendering the liquid crystal composition between the selected electrodes visually distinguishable from the remaining composition.

11. The liquid crystal display device of claim 9, wherein both substrates and electrodes are transparent for forming a transmissive display device.

12. The liquid crystal display device of claim 11, further including a reflector positioned adjacent to one polarizer for forming a reflective display device.

13. A liquid crystal composition comprising
between about 30 and 80 percent by weight of at least one P,P'-dialkylazoxybenzene component having the general formula (1) as follows:

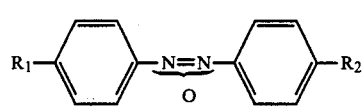

(1)

wherein $R_1$ represents a straight-chain alkyl group having 1-10 carbon atoms and $R_2$ represents a straight-chain alkyl group having 1-10 carbon atoms;

between about 5 and 20 percent by weight of at least one compound having the general formula (4) as follows:

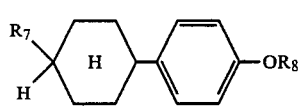

(4)

wherein $R_7$ represents a straight-chain alkyl group having 1-10 carbon atoms and $R_8$ represents a straight-chain alkyl group having 1-10 carbon atoms;

an effective amount of at least one compound having positive dielectric anistropy to give the composition a new positive dielectric anistropy; and at least one of compounds (2) and (3) having the general formulae:

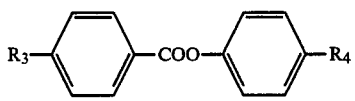

(2)

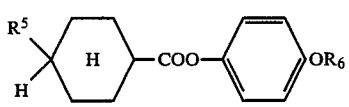

(3)

wherein $R_3$ represents a straight-chain alkyl or straight-chain alkoxy group having 1-10 carbon atoms, $R_4$ represents a straight-chain alkyl or straight-chain alkoxy group having 1-10 carbon atoms, $R_5$ represents a straight-chain alkyl group having 1-8 carbon atoms and $R_6$ represents a straight-chain alkyl group having 1–10 carbon atoms and wherein, when present, compound (2) is included in an amount between about 5 and 20 percent by weight and, when present, compound (3) is included in an amount between about 5 and 50 percent by weight.

14. The liquid crystal composition of claim 13, wherein the compound exhibiting a positive dielectric anistropy is selected from the group consisting of biphenyl liquid crystal compounds, phenylcyclohexane liquid crystal compounds, terphenyl liquid crystal compounds, biphenylcyclohexane liquid crystal compounds or mixtures thereof.

* * * * *